United States Patent

[11] 3,537,429

| [72] | Inventor | Gerald D. Regan<br>4280 Juliet Drive, Elgin, Illinois 60120 |
|---|---|---|
| [21] | Appl. No. | 811,081 |
| [22] | Filed | March 27, 1969 |
| [45] | Patented | Nov. 3, 1970 |

[54] ANIMAL AND BIRD FEEDER
5 Claims, 3 Drawing Figs.

| [52] | U.S. Cl. | 119/51, D30/14 |
|---|---|---|
| [51] | Int. Cl. | A01k 05/00 |
| [50] | Field of Search | 119/51; D30/13—15 |

[56] References Cited
UNITED STATES PATENTS

| D119,499 | 3/1940 | Howard | D30/14 |
|---|---|---|---|
| 1,751,388 | 3/1930 | Bircher | 119/51 |
| 2,709,985 | 6/1955 | Clauson | 119/18 |

*Primary Examiner*—Aldrich F. Medbery
*Attorney*—Greist, Lockwood, Greenawalt & Dewey ABSTRACT: Ears of corn project laterally from a vertical member which is freely rotatable around a horizontal axis and is mountable on a tree trunk. This feeder provides action and interest in observing feeding activities of birds, squirrels, and other tree-borne wildlife.

Patented Nov. 3, 1970

3,537,429

INVENTOR
GERALD D. REGAN
By Darbo, Robertson & Vandenburgh
Attorneys

# 3,537,429

ANIMAL AND BIRD FEEDER

BACKGROUND OF THE INVENTION

Not the least of the charm and enjoyment of semirural living is the fact that living in such settings affords man the opportunity, at least to some limited degree, to commune with nature—to observe from the comfort of his homestead, small wild animals such as birds and squirrels.

One of the benefits of providing bird and animal feeders is the fact that these feeders do attract a wide variety of wild life to a site at which the animals and birds can be conveniently and comfortably observed by man, thus helping him achieve more fully some of the benefits of suburban or semirural living.

Bird and animal feeders should be simple in construction, and, more importantly, conveniently maintained and conveniently replenishible. However, a serious shortcoming of most bird and animal feeders heretofore available is the fact that such feeders merely provide a feeding site and provide very little interesting action.

It is an object of this invention to provide a tree-animal and bird feeder which can be easily maintained, which can be easily replenished and which will effectively attract wildlife. It is an important object of this invention to provide an animal and bird feeder which will permit the animals themselves to provide a greater degree of interesting action in the course of their feeding activities.

DESIGNATION OF THE FIGURES

DESCRIPTION OF THE PREFERRED EMBODIMENT

Figure 1:
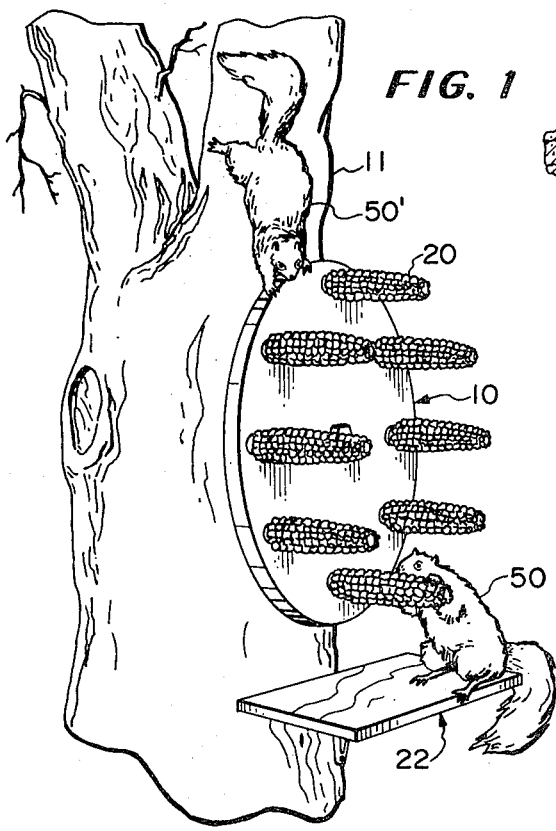
FIG. 1 is the perspective view showing the feeder of this invention mounted on a tree trunk.

Although the following disclosure offered for public dissemination, in return for the grant of a patent, is detailed to ensure adequacy and aid understanding, this is not intended to prejudice that purpose of a patent which is to cover each new inventive concept therein no matter how others may later disguise it by variations in form or additions for further improvements. The claims at the end hereof are intended as the chief aid toward this purpose; as it is these that meet the requirement of pointing out the parts, improvements, or combinations in which the inventive concepts are found.

In accordance with this invention, feeder, generally 10, is mountable on tree trunk 11 and includes vertical member, or disc 13, which is freely rotatable around a horizontal axis, disc support means, generally 15, and laterally projecting spaced-apart support means 17 for supporting a plurality of ears of corn 20. Shelf means 22 is preferably fixed approximately 8 inches below feeder disc 13. Disc 13 is preferably made from wood. Corn support means 17 may be provided by forcing large nails 23, through holes 24 in disc 13. Corn support means 17 and corn ears 20 are preferably distributed throughout the face of disc 13 to provide a center of gravity approximately the center of disc 13. While the illustrated preferred embodiment provides ears of corn distributed in the form of a circle near the periphery of disc 13, it is not essential that the ears be distributed in this manner.

Disc support means, generally 15, includes base plate 25, bolt 26 secured to base plate 25 by welds 27, between base plate 25 and bolt head 28. Axle 30, which is the threaded shaft of bolt 26, extends through pipe, or bearing 31. Bearing 31 is snugly fitted through a hole 32 in the centers of disc 13 and reinforcement plate 35 which is fixed to disc 13. Disc 13 is rotatably retained on axle 30 by retaining nut 40. Thus axle 30 provides for the rotation of disc 13 around a horizontal axis.

Shelf, generally 22, comprises platform 42, bracket 43, and securing means 44 for securing the shelf to the supporting structure, e.g., tree trunk 11. In the illustrated embodiments base plate 25 and shelf, generally 22 are secured to the tree trunk by double-headed nails 45. This is not essential, but is preferred for the purpose of facilitating convenient transfer of the feeder of this invention from one location to another.

OVERALL OPERATION

Figure 2:
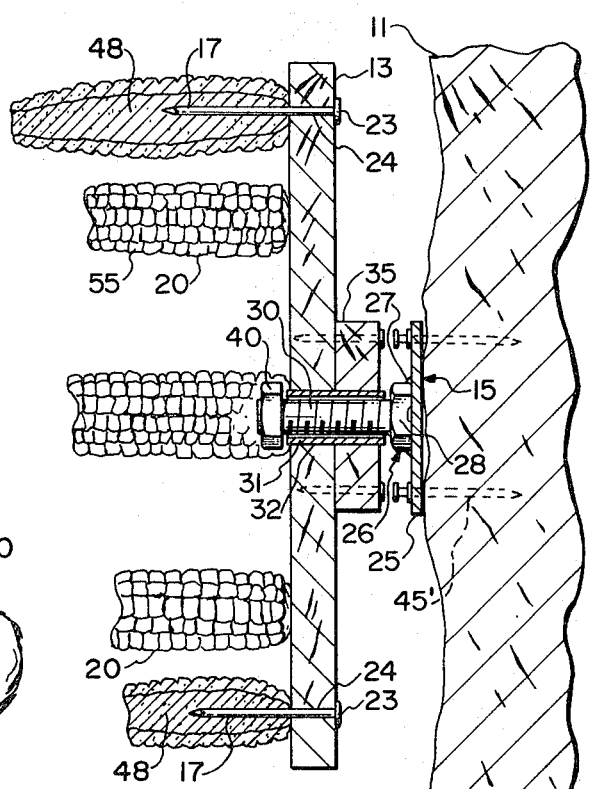
FIG. 2 is an elevational view of the feeder of this invention.
Figure 2:
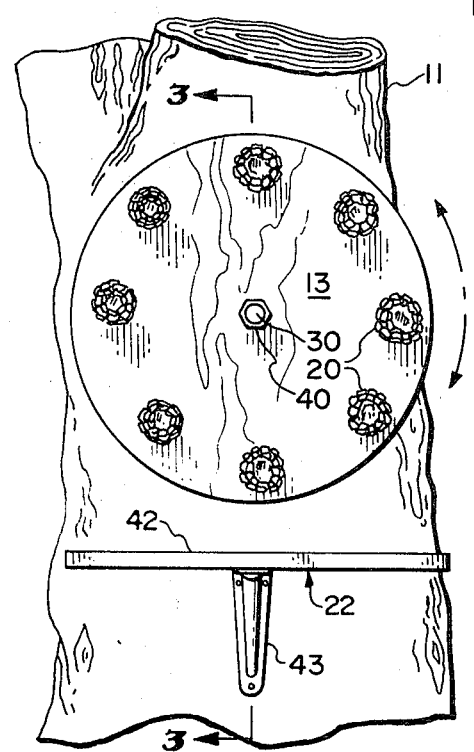
Figure 3:
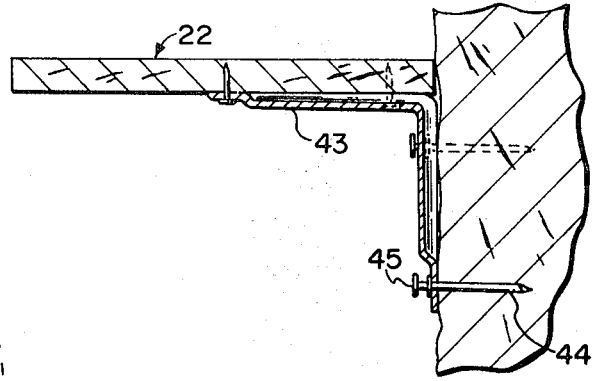
FIG. 3 is a fragmentary enlarged cross-sectional view taken approximately along the lines 3–3 of FIG. 2.

Bracket 43, and base plate 25 are secured to suitable horizontal support structure such as tree trunk 11 by double-headed nails 45, 45'. It is noted that feeder support means which comprise bands or other devices which encircle a tree trunk should be avoided. It is generally believed that such mounting means will, in time, adversely effect the growth of the tree and the circulation of tree fluids, as the trunk grows. Thus, driving nails directly through the bark into the woody portion of the tree is highly preferred, since this causes minimal damage to the tree. Disc 13, fixed reinforcement plate 35, and bearing 31, are fitted over axle 30 and are retained in place by retaining nut 40. Ears of corn are then positioned over corn retaining means 17. Since the center, or core 48, of ears 20 is a relatively soft, pithy material, ears 20 are readily inserted over pointed metallic spindles such as nails 23. In this condition ears 20 project laterally from the side of disc 13. Everything fixed to disc 13 is thus freely rotatable with disc 13 in either direction as indicated by the arrows at the right side of FIG. 2.

Also, in the preferred embodiment, ears 20 are spaced apart a sufficient distance (preferably 2½ inches or more) to permit a small animal such as squirrel 50 to pass between adjacent ears. This affords the animal an opportunity to climb onto disc 13, or on top of ears which happen to be situated in the then lower-most portion of disc 13. As squirrel 50 attempts to crawl around on disc 13, or to climb from ear to ear, the animal causes disc 13 to rotate. Likewise, animal 50' approaching the feeder from the top, as illustrated in FIG 1, also tends to cause the feeder to rotate. Since the ears are positioned to provide ingress and egress therebetween, rotation of the disc does not diminish the animal's access to the interior portions of disc 13, or restrict the animal's egress from the feeder.

Shelf 22 is positioned below feeder disc 13 at whatever distance appears most suited to the particular size of the available animals. However, generally speaking, I prefer that for most purposes shelf 22 be positioned approximately 8 inches below disc 13. This affords a small animal such as a squirrel standing on the shelf an opportunity to reach only those ears 20 which happen to be situated in the then lower-most portion of disc 13. However, in order to obtain access to other ears the animal must necessarily climb into the feeder between adjacent ears of corn or approach the feeder from the top. Because of the flat configuration of disc 13, and generally rounded configuration of tree trunks the squirrels will be "forced" to climb through the feeder to reach corn at rest near the sides of the disc, and I have found that squirrels generally approach the device from above or below. Of course, any action by the squirrel which tends to rotate the disc 13, also brings new food closer to it.

In the embodiment illustrated, I have found that the pithy core 48 of ears 20 is resilient enough, generally, to cause ear 20 to be quite firmly secured to spindle 17. However, occasionally a particular ear is quite loosely held on spindle 17, so that that ear is, itself, freely rotatable around spindle, or nail 17, as a horizontal axis.

This unexpected rotatability of a particular ear causes an additional interest factor, and helps generate a greater appreciation of the consummate skill, reflexes, and speed of squirrels, for example. As an animal climbs or runs from ear to ear, for example, it successfully compensates for the rotatability of a particular ear 20, of corn.

Hence, laterally projecting from disc 13, are a plurality of elements which provide two functions. Elements 17 are means for attaching food to disc 13. Ears 20, attached to spindles 17, not only serve as food, but also serve as animal support members. It is noted that even after kernels are removed from an ear, the remaining cob is, by its nature, a nearly ideal component for supporting a squirrel.

When from time to time, the ears need replenishing, they are very easily withdrawn from supporting means 17 and fresh ears 20 are placed in position by inserting the pithy core over nails 17. The use of this invention is not limited to feeding of corn, and other foods can be used in accordance with this invention.

Since most corn has a somewhat golden yellow color I prefer that disc 13 be painted or coated a dark brown color for decorative effect.

ACHIEVEMENT

I have found that the feeder of this invention not only attracts a wide variety of birds and small animals such as squirrels to the site of its location, but moreover provides an unusually high degree of interesting activity in the course of the animal's feeding activities. Yet, the feeder of this invention is relatively, simply and economically manufactured, easily maintained and is readily replenished.

As a consequence of the positioning of the feed to project laterally from freely rotating disc 13, small wild life is induced to climb upon disc 13, and laterally projecting members to reach the feed. The activities of the animals in their contacts with the feeding device, causes the disc to rotate, or move back and forth. This, in turn, generates action responses from the animal, which are interesting and entertaining to the observer, and harmless, even though apparently interesting, to the animal.

I claim:

1. An animal feeder including: rotatable vertical support member said member being freely rotatable around a horizontal axis; horizontally disposed animal food support members projecting laterally from said rotatable support member; a plurality of animal support members projecting laterally from said food support members being spaced-apart a sufficient distance to allow passage of a small animal therebetween and attachement means for rotatably supporting the rotatable support member.

2. An animal feeder comprising a disc; means for freely rotatably supporting said disc in a substantially vertical plane for rotation about a horizontal axis, means extending outwardly from the disc for attaching a plurality of ears of corn to a side of the disc.

3. The feeder of claim 2 in which the means for attaching ears of corn include pointed metallic shaft for piercing and penetrating the pithy core of the corn ear.

4. The feeder of claim 2 which includes an animal support shelf positioned below the disc.

5. The feeder of claim 2 in which ears of corn are fixed near the periphery of the disc and are spaced apart from each other a sufficient distance to permit a squirrel to pass therebetween.